US007453807B2

United States Patent
Sanchez et al.

(10) Patent No.: US 7,453,807 B2
(45) Date of Patent: Nov. 18, 2008

(54) EFFICIENT RENDEZVOUS POINT TREE TO SHORTEST PATH TREE SWITCH-OVER PROCESS

(75) Inventors: Juan Diego Sanchez, San Jose, CA (US); Apurva Mehta, Cupertino, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1003 days.

(21) Appl. No.: 10/453,974

(22) Filed: Jun. 4, 2003

(65) Prior Publication Data
US 2003/0223372 A1 Dec. 4, 2003

Related U.S. Application Data

(60) Provisional application No. 60/386,079, filed on Jun. 4, 2002.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .................. 370/235; 370/252; 370/400
(58) Field of Classification Search .............. 370/238, 370/236.1, 236.2, 237; 709/238
See application file for complete search history.

(56) References Cited

U.S. PATENT DOCUMENTS

| 6,321,270 | B1 * | 11/2001 | Crawley ................. 709/238 |
| 2001/0034793 | A1 * | 10/2001 | Madruga et al. ........... 709/238 |
| 2003/0007485 | A1 * | 1/2003 | Venkitaraman et al. ..... 370/389 |
| 2003/0088696 | A1 * | 5/2003 | McCanne ................. 709/238 |

* cited by examiner

Primary Examiner—Seema S. Rao
Assistant Examiner—Leon Andrews

(57) ABSTRACT

A method of operating a network node in PIM-SM (Protocol Independent Multicast-Sparse Mode) is disclosed. In one embodiment, a Rendezvous Point Tree (RPT) to Shortest Path Tree (SPT) switch over process is initiated after the packet flow rate of the RPT data stream is compared against a predetermined threshold using a reverse rate limiting technique. If the packet flow rate of the RPT data stream exceeds the threshold, further analysis can be performed to decide whether the RPT to SPT switch over process should be initiated. Otherwise, if the packet flow rate does not exceed a predetermined threshold, the network node continues to receive multicast packets via the RPT until the predetermined threshold is reached.

15 Claims, 5 Drawing Sheets

EFFICIENT RENDEZVOUS POINT TREE TO SHORTEST PATH TREE SWITCH-OVER PROCESS

CROSS-REFERENCE TO RELATED APPLICATIONS

This application is entitled to the benefit of provisional Patent Application Ser. No. 60/386,079, filed Jun. 4, 2002, which is hereby incorporated by reference for all purposes.

FIELD OF THE INVENTION

The present invention relates generally to the field of computer networking and more specifically to the routing of multicast packets within a computer network.

BACKGROUND OF THE INVENTION

In Protocol Independent Multicast-Sparse Mode (PIM-SM), a router with directly connected hosts is referred to as a Last-Hop-Router (LHR). When one of the hosts attached to the LHR wants to receive multicast traffic, the LHR sends a PIM-JOIN message towards the network's Rendezvous Point router (RP). The RP then connects the source of the multicast flow to the LHR.

Multicast traffic initially arrives at the LHR via the Rendezvous Point Tree (RPT), which is a network path that connects the RP to the LHR. Once multicast traffic arrives at the LHR via the RPT, the LHR has the option of requesting that the multicast traffic arrives directly from the source of the traffic via a Shortest Path Tree (SPT). The main reason for the LHR to request that the multicast traffic arrives via the SPT is to reduce latency (typically the path via the RPT is longer, and therefore the delay is usually longer). Once the LHR starts receiving the multicast traffic via the SPT, it sends a notification to the RP, informing it that the LHR no longer needs to receive that particular multicast flow via the RPT.

This mechanism of initially receiving a multicast flow via the RPT, then requesting that the flow arrives via the SPT, and finally informing the RP that it doesn't need to forward the flow anymore, is usually referred to as the "RPT-to-SPT switchover process".

One mechanism commonly used by the LHR to decide when to initiate the switch to the SPT is to monitor the packet flow rate of the multicast packets received via the RPT. If the rate surpasses a threshold established by the user, then the LHR initiates the switch to the SPT.

Monitoring the packet flow rate can be a resource-intensive operation. A software process performing this task can become a bottleneck within the LHR, especially if the software process has to frequently poll and calculate the packet flow rates for multiple multicast flows.

Accordingly, what is needed is a method for efficiently monitoring the packet flow rates of multiple multicast packet flows received via the RPT without consuming significant resources of the network node. What is also needed is a network node that can efficiently monitor the packet flow rates of multiple multicast packet flows received via the RPT.

SUMMARY OF THE INVENTION

An embodiment of the invention is a method for efficiently monitoring the packet flow rates of multiple multicast packet flows in a computer network. In particular, the method utilizes a hardware-assisted Reverse Rate Limiting process to assess whether the packet flow rate of a stream of multicast packets exceeds a predetermined or user-established threshold. If the packet flow rate exceeds the predetermined or user-established threshold, the multicast packets are forwarded to interfaces where interested host receivers have been detected (normal processing); in addition, the appropriate component in the system is notified so that resource intensive processes are also performed on the stream of multicast packets (e.g. join messages towards via the SPT are periodically transmitted). However, if the packet flow rate is below the predetermined or user-established threshold, the packets are simply forwarded to interfaces where interested host receivers have been detected, but no other components in the system get notified about these packets. Thus, the network node does not waste processing cycles on packet streams with low flow rates.

In one embodiment of the invention, the method is consistent with the Protocol Independent Multicast-Sparse Mode (PIM-SM) protocol. In this embodiment, a network node initiates a Rendezvous Point Tree (RPT) to Shortest Path Tree (SPT) switch over process after it has determined that the packet flow rate of multicast packets received via the RPT exceeds a predetermined or user-established threshold. In particular, the network node determines whether the packet flow rate exceeds the predetermined or user-established threshold by using a Reverse Rate Limiting process.

In one embodiment, the Reverse Rate Limiting process entails duplicating packets received via the RPT, sending the duplicated packets to a processor if the packet flow rate of the duplicated packets exceeds the predetermined threshold, or dropping/eliminating the duplicated packets if the packet flow rate of the duplicated stream does not exceed a predetermined threshold. At the processor, additional sampling or polling may be performed by software to decide whether a RPT to SPT switch over should occur. The processor then initiates a RPT to SPT switch over if appropriate.

Embodiments of the invention include the above and further include a network node that includes (a) logic for duplicating a RPT packet stream; (b) rate limiting logic that is programmed or configured to perform reverse rate limiting on a the duplicated RPT packet stream; and (c) a processing unit or processor for initiating a RPT to SPT switch over process depending on the outputs of the rate limiting logic circuits.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION OF THE INVENTION

By way of background, Protocol Independent Multicast (PIM) is used for efficiently routing packets to multicast groups that might span wide-area and interdomain internetworks. It is called "protocol independent" because it does not depend on a particular unicast routing protocol. PIM can operate in sparse, dense, or sparse-dense mode in a network. Each mode has distinct operating advantages in different network environments. Embodiments of the invention are discussed herein in conjunction with PIM-Sparse Mode (PIM-SM). However, it should be understood that the invention can be applied to PIM-Dense Mode and Spare-Dense Mode and other multicast protocols.

In PIM sparse mode (PIM-SM), routers must join and leave multicast groups explicitly. Upstream routers do not forward multicast traffic to a router unless it has sent an explicit request (by means of a PIM-JOIN message) to the Rendezvous Point (RP) router to receive this traffic. The RP serves as the root of the shared multicast delivery tree and is responsible for forwarding multicast data from different sources to the receivers.

Figure 1A:
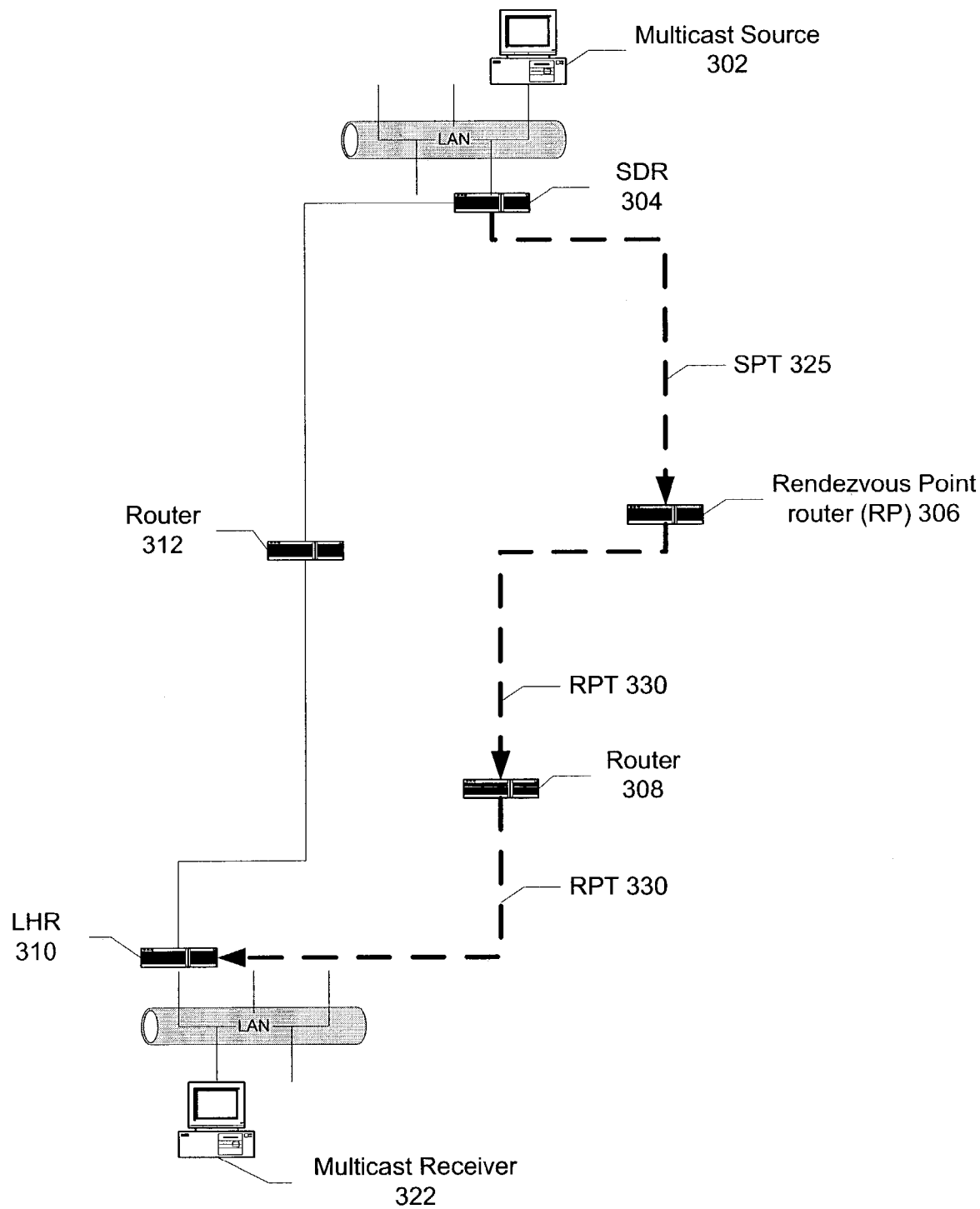
FIGS. 1A and 1B depict data flows of multicast packets in Protocol Independent Multicast-Sparse Mode.
Figure 1B:
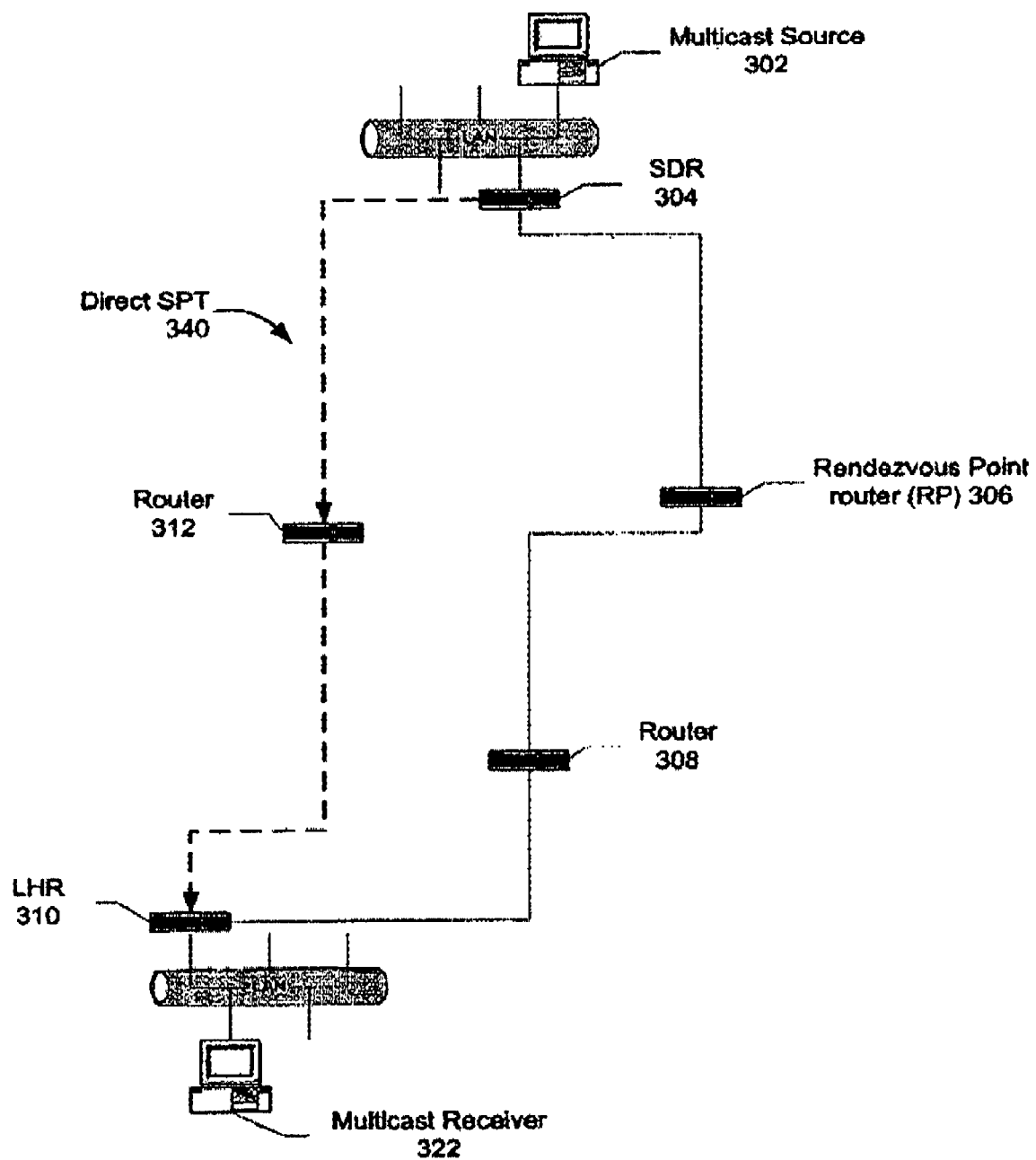

A brief discussion of the operations of PIM-SM relevant to the some embodiments of the invention is provided in the following with reference to FIGS. 1A and 1B. A PIM-SM domain uses Reverse Path Forwarding (RPF) to create a path from a receiver requesting the data to the data source. When Multicast Receiver 322 issues a PIM-JOIN message, an RPF check is triggered. The PIM-JOIN message is sent towards the RP 306 from the receiver's designated router (RDR) or Last Hop Router (LHR) 310. The PIM-JOIN message is multicast hop by hop upstream to the RP 306 by means of each intermediate router's RPF interface. When the RP 306 receives the PIM-JOIN message, it adds the interface on which the message was received to its forwarding information table. This builds the RPT 330 connecting the Multicast Receiver 322 with the RP 306. The RPT 330 remains available, even if no active sources generate traffic.

The RPT 330 is a unidirectional tree, permitting traffic to flow down from the RP 306 to the receivers in one direction. For multicast traffic to reach the Multicast Receiver 322 from the Multicast Source 302, another branch of the distribution tree 325 called the Shortest Path Tree (SPT) needs to be built from the source's designated router (SDR) 304 to the RP 306.

The SPT 325 is typically created in the following way:

1. When the Multicast Source 302 becomes active, it sends out multicast packets on the LAN to which it is attached. The SDR 304 receives the packets and encapsulates them in a PIM Register message, which it sends out to the RP 306.

2. When the RP 306 receives the PIM Register message, it adds the IP address of the Multicast Source 302 to its forwarding information table. The RP 306 also sends a PIM-JOIN message back to the Multicast Source 302.

The problem of using the RPT 330 to deliver multicast traffic to the Multicast Receiver 322 is that it may not be the most direct path. Instead of continuing to use the SPT 325 and the RFT 330 to deliver multicast packets, the LHR 310 can initiate a RPT to SPT switch over process (also known as SPT cutover) to create a direct SPT 340 (FIG. 1B) between the Multicast Source 302 and the Multicast Receiver 322. The RPT to SPT switch aver process typically includes the following steps:

1. Once the LHR 310 receives multicast packet(s) from the Multicast Source 302 via the RPT 330, the LHR 310 sends a PIM-JOIN message to its RPF neighbor towards the Multicast Source 302.

2. The PIM-JOIN message is multicast hop by hop upstream to the SDR 304 by means of each intermediate router's RPF interface.

3. When the SDR 304 receives the PIM-JOIN message, and it adds an additional (SE) state to its forwarding information tables to form the direct SPT 340.

4. Multicast packets from that Multicast Source 302 will then flow down the direct SPT 340 to the LHR 310. Note that multicast packets also flow down the SPT 325 and RPT 330 (FIG. 1A) towards the Multicast Receiver 322. Thus, the LHR 310 will now receive two copies of each multicast packet sent by the source one—from the RPT 330 and one from the direct SPT 340.

5. When the LHR 310 receives the first multicast packet, it sends a PIM-PRUNE message to the RP 306 to stop duplicate packets being sent through the RPT 330.

6. The RP 306 then sends a PIM-PRUNE message over the SPT 325 towards the SDR 304 to halt delivery of multicast packet from that particular Multicast Source 302 to the RP 306.

One mechanism commonly used by a LHR to decide when to initiate the RPT to SPT switch over process is to monitor the packet flow rate of the multicast packets received via the RPT. If the RPT packet flow rate surpasses a predetermined or user-established threshold, then the LHR can initiate the switch to the SPT.

Monitoring the packet flow rate can be a resource-intensive operation. A software process performing this task can become a bottleneck within the LHR, especially if the software process has to frequently poll and calculate the packet flow rates for multiple multicast flows.

An efficient method for monitoring the packet flow rate of a multicast packet flow is provided by the present invention. According to one embodiment, the LHR duplicates a stream of multicast packets received via a RPT of the network, and uses a hardware-assisted Reverse Rate Limiting process on the duplicated packets to "screen out" packet streams that have a low packet flow rate. In particular, the LHR drops the duplicated packets if the packet flow rate is below or equal to a predetermined or user-established threshold. The LHR. however, wilt analyze the duplicated packets to decide whether it should initiate the RPT to SPT switch over if the packet flow rate exceeds the user-established threshold. In this way, significant processing resources can be saved.

Note that the Reverse Rate Limiting process performed by the LHR is exactly opposite to typical rate limiting processes. That is, typical rate limiters drop packets if the flow rate exceeds a predetermined threshold, while the Reverse Rate Limiting process drops packets if the flow rate does not exceed a predetermined threshold.

Figure 2:
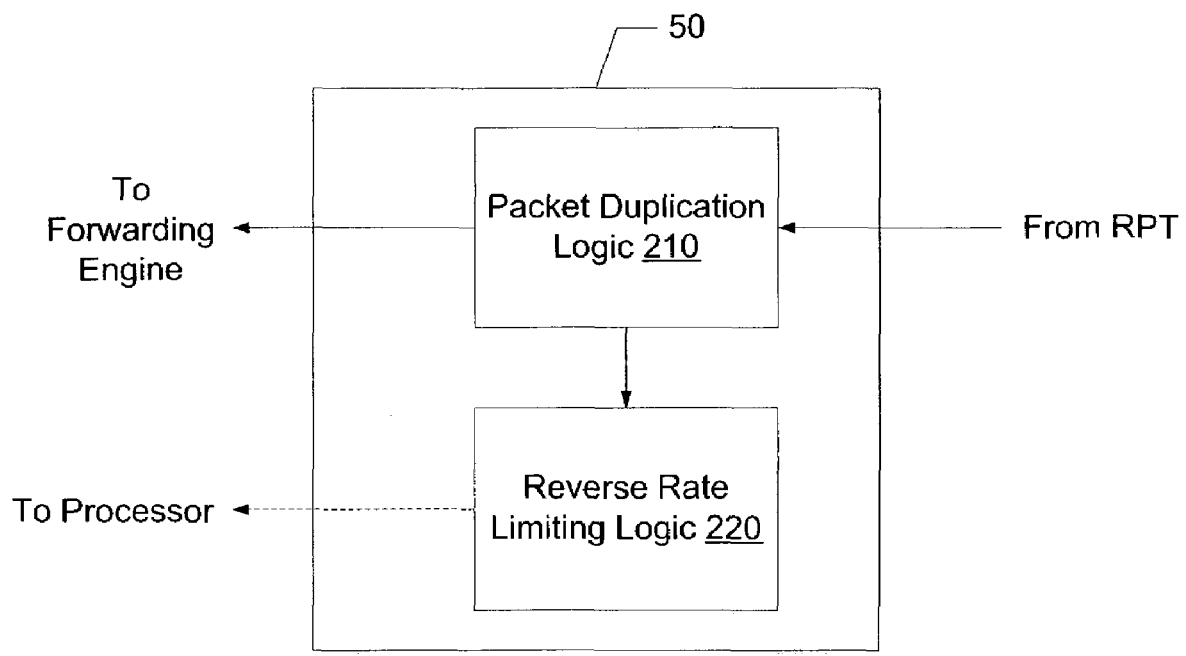
FIG. 2 depicts logic circuits for performing reverse rate limiting on an RPT packet stream according to one embodiment of the invention.

FIG. 2 depicts a Reverse Rate Limiter 50 that performs a Reverse Rate Limiting process in accordance with an embodiment of the invention. The Reverse Rate Limiter 50, which includes Packet Duplication Logic 210 and Reverse Rate Limiting Logic 220, can be implemented within in a network node, such as a router or switch. After receiving a stream of multicast packets from a RPT, the Packet Duplication Logic 210 duplicates the multicast packets and provides one stream of packets to the Reverse Rate Limiting Logic 220. The other stream is provided to a forwarding engine or other logic of the network node to be distributed to their respective destination interfaces.

The Reverse Rate Limiting Logic 220, depending on the packet flow rate of the multicast packets, will either drop the packets or forward the packets to a processor of the network node, which is configured to initiate a RPT to SPT switch over process upon receiving the multicast packets. In one embodiment, the processor may perform additional analyses on the duplicated packets before initiating the RPT to SPT switch over process.

In one embodiment, the Reverse Rate Limiting Logic 220 is implemented by rate limiting circuits that are programmed by micro-code to perform reverse rate limiting. In one embodiment, the predetermined threshold can be established by micro-code.

Figure 3:
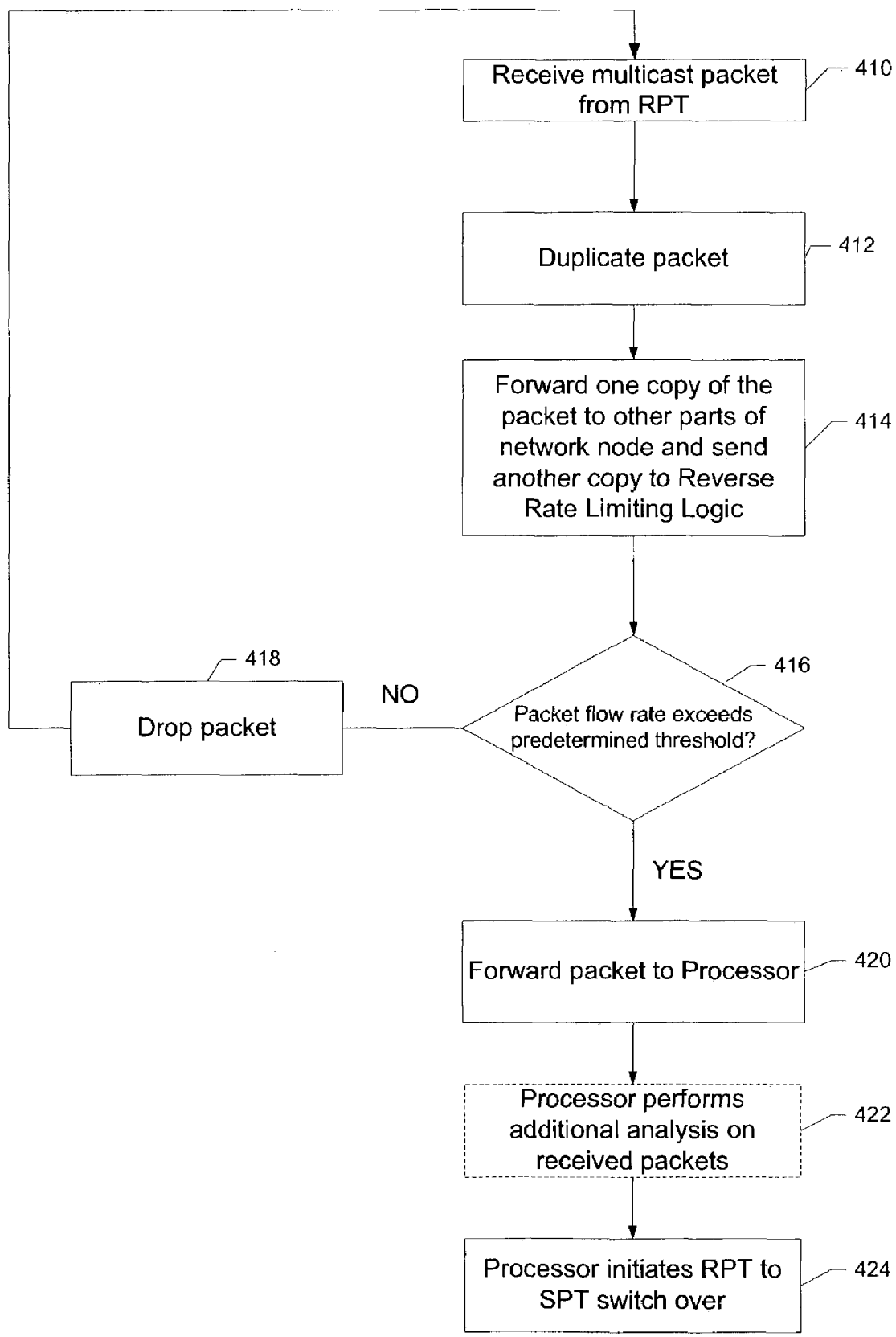
FIG. 3 is a flow diagram depicting some operations of the logic shown in FIG. 3 according to the invention.

FIG. 3 is a flow diagram depicting some operations of the Reverse Rate Limiter 50 of FIG. 2 in accordance with an embodiment of the invention. As shown, at step 410, the Reverse Rate Limiter 50 receives a multicast packet via a RPT. At step 412, the Reverse Rate Limiter 50 duplicates the multicast packet and forwards one copy to other parts (e.g., forwarding logic) of the network node.

At decision point 416, the Reverse Rate Limiter 50 determines whether the packet flow rate of the other stream exceeds a predetermined or user-established threshold. If not, at step 418, the Reverse Rate Limiter 50 drops the multicast packets. The Reverse Rate Limiter 50 then continues to receive multicast packets from the RP. However, if the packet flow rate exceeds the predetermined or user-established threshold, the Reverse Rate Limiter 50 forwards the multicast packets to a Processor of the network node for further processing/analysis.

At optional step 422, the Processor, knowing that the packet flow rate from the RP exceeds the pre-determined or user-established threshold, performs additional analyses on the stream of packets. At step 424, the Processor initiates a RPT to SPT switch over process.

Figure 4:
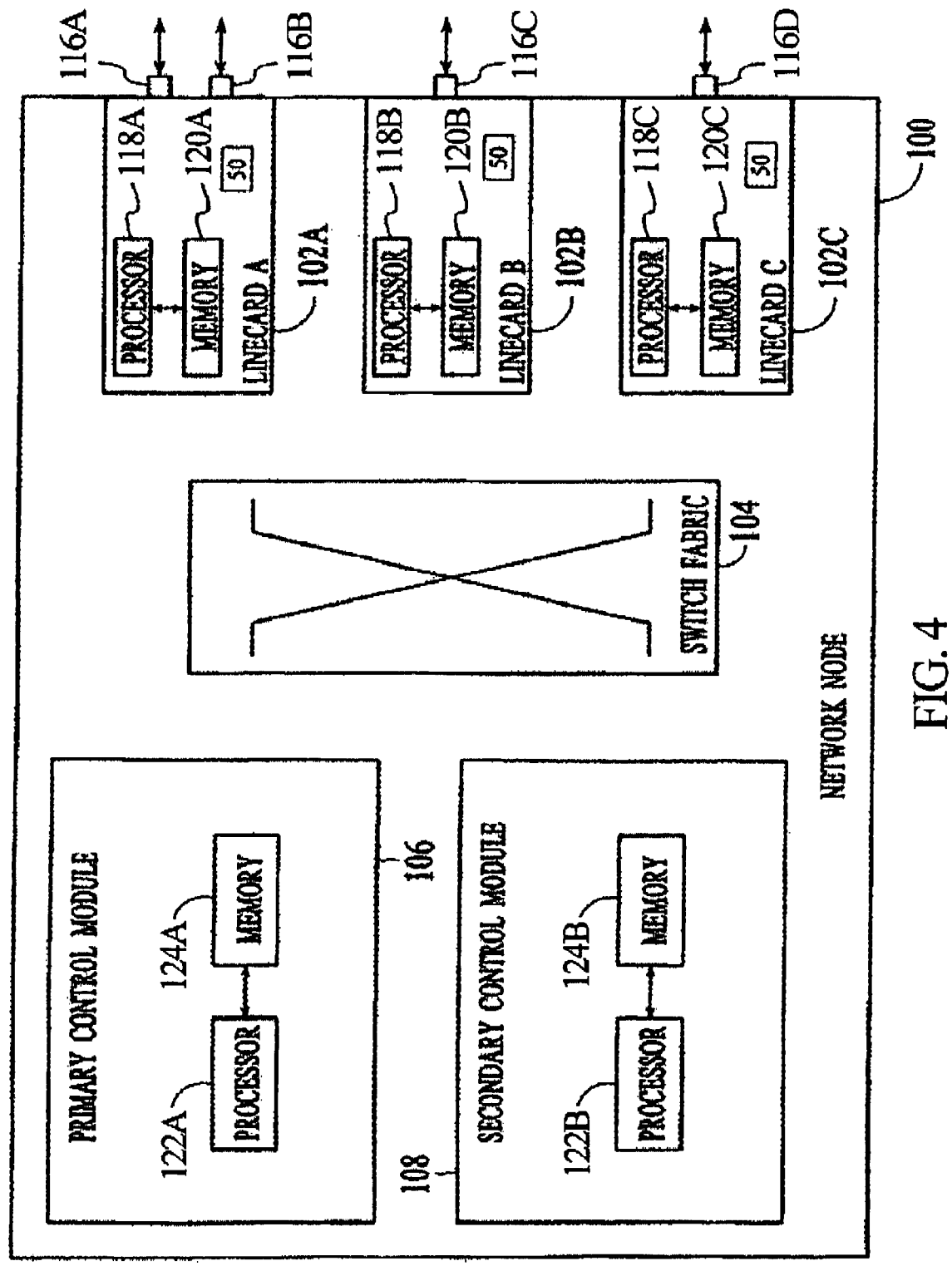
FIG. 4 depicts details of a network node in which an embodiment the invention can be implemented.

FIG. 4 illustrates details of a network node 100 in which an embodiment of the invention can be implemented. The network node 100 includes a primary control module 106, a secondary control module 108, a switch fabric 104, and three line cards 102A, 102B, and 102C (line cards A, B, and C). The switch fabric 104 provides datapaths between input ports and output ports of the network node 100 and may include, for example, shared memory, shared bus, and crosspoint matrices.

The primary and secondary control modules 106 and 108 support various switch/router and control functions, such as network management functions and protocol implementation functions. The control modules 106 and 108 each include a processor 122A and 122B and memory 124A and 124B for carrying out the various functions. The processors 122A and 122B may include a multifunction microprocessor (e.g., an Intel i386 processor) and/or an application specific processor that is operationally connected to the memory. The memories 124A and 124B may include electrically erasable programmable read-only memory (EEPROM) or flash ROM for storing operational code and dynamic random access memory (DRAM) for buffering traffic and storing data structures, such as forwarding information.

The line cards 102A, 1028, and 102C include ports 116A-D, processor 118A-C, and memories 120A-C. Each of the processors 118A-C may be a multifunction processor and/or an application specific processor that is operationally connected to the corresponding memories 120A-C, which can include a RAM or a Content Addressable Memory (CAM). Each of the processors 118A-C performs and supports various switch/router functions. Each line card also includes a Reverse Rate Limiter 50. The Reverse Rate Limiter 50 decides whether a multicast packet received through ports 116A-D is to be dropped or forwarded to a Processor (e.g., Processor 122A) where software for initiating a RPT to SPT switch over process is executed.

Although specific embodiments of the invention have been described and illustrated, the invention is not to be limited to the specific forms or arrangements of parts as described and illustrated herein. For instance, it should also be understood that throughout this disclosure, where a software process or method is shown or described, the steps of the method may be performed in any order or simultaneously, unless it is clear from the context that one step depends on another being performed first. The invention is limited only by the claims.

What is claimed is:

1. A method for operating a network node, comprising:
    receiving a stream of data packets from a source via an intermediate network node and forwarding the data packets to their respective destinations;
    performing a reverse rate limiting process to determine whether a packet flow rate of the stream of data packets exceeds a predetermined flow rate threshold; and
    depending on at least in part a result of the reverse rate limiting process, initiating a switch over process to cause additional data packets from the source to be routed along a network path that does not include the intermediate network node;
    wherein the reverse rate limiting process comprises:
    duplicating the stream of data packets;
    dropping the duplicated stream of data packets if the packet flow rate of the duplicated stream of data packets is below or equal to the predetermined flow rate threshold; and
    forwarding the duplicated stream of data packets to a processing unit of the network node if the packet flow rate exceeds the predetermined flow rate threshold.

2. The method of claim 1, wherein the initiating step comprises initiating the switch over process after the processing unit receives the duplicated stream of data packets.

3. The method of claim 1, wherein the stream of data packets comprise multicast data packets.

4. The method of claim 1, wherein the intermediate network node comprises a Rendezvous Point (RP) router.

5. The method of claim 1, wherein the switch over process comprises a Rendezvous Point Tree (RPT) to Shortest Path Tree (SPT) switch over process.

6. A network node, comprising:
    one or more input ports configured to receive a stream data packets via an intermediate network node and one or more output ports configured to send the data packets to a plurality of host computers;
    reverse rate limiting logic coupled to the input port, wherein the reverse rate limiting logic is configured to duplicate the stream of data packets, and wherein the reverse rate limiting logic is configured to output the duplicated stream if a packet flow rate of the duplicated stream of data packets is above a predetermined flow rate threshold; and
    a processing unit coupled to the reverse rate limiting logic and configured to initiate a switch over process after the processing unit receives the duplicated stream from the reverse rate limiting logic, wherein the switch over process causes packet streams from the source to be sent to the network node without routing through the intermediate network node;
    wherein the reverse rate limiting logic is configured to drop data packets of the duplicated stream unless the packet flow rate of the duplicated stream of data packets is above a predetermined flow rate threshold.

7. The network node of claim 6, wherein the reverse rate limiting logic comprises rate limiting logic circuits programmed by micro-code.

8. The network node of claim 6, wherein the stream of data packets comprise multicast data packets.

9. The network node of claim 6, wherein the intermediate network node comprises a Rendezvous Point (RP) router.

10. The network node of claim 6, wherein the switch over process comprises a Rendezvous Point Tree to Shortest Path Tree switch over process.

11. A network node, comprising:

means for receiving a stream of data packets from a source via an intermediate network node and forwarding the data packets to their respective destinations;

means for performing a reverse rate limiting process to determine whether a packet flow rate of the stream of data packets exceeds a predetermined flow rate threshold; and means for initiating a switch over process to cause additional data packets from the source to be routed along a network path that does not include the intermediate network node, wherein the means for initiating does not initiate the switch over process if the packet flow rate does not exceed the predetermined flow rate threshold;

wherein the means for performing a reverse rate limiting process comprises:

means for duplicating the stream of data packets;

means for dropping the duplicated stream of data packets if the packet flow rate of the duplicated stream of data packets is below or equal to the predetermined flow rate threshold; and means for forwarding the duplicated stream of data packets to the means for initiating if the packet flow rate exceeds the predetermined flow rate threshold.

12. The network node of claim 11, wherein the means for initiating comprises means for initiating the switch over process after receiving the duplicated stream of data packets.

13. The network node of claim 11, wherein the stream of data packets comprise multicast data packets.

14. The network node of claim 11, wherein the intermediate network node comprises a Rendezvous Point (RP) router.

15. The network node of claim 11, wherein the switch over process comprises a Rendezvous Point Tree to Shortest Path Tree switch over process.

* * * * *